United States Patent [19]
Van Daalen et al.

[11] 3,763,656
[45] Oct. 9, 1973

[54] PLACING OFFSHORE SUPPORTING ELEMENTS

[75] Inventors: Francois Van Daalen; Johannes Van Steveninck; Gerardus A. M. Verroen, all of Rijswijk, Netherlands

[73] Assignee: Shell Oil Company, New York, N.Y.

[22] Filed: Aug. 16, 1971

[21] Appl. No.: 172,180

[52] U.S. Cl. ........................ 61/53.74, 61/36, 61/50
[51] Int. Cl. .............................................. E02d 7/24
[58] Field of Search ................ 61/53.74, 72.4, 50, 61/52, 46.5, 36

[56] References Cited
UNITED STATES PATENTS
2,919,552  1/1960  Hayward .......................... 61/46.5
1,574,439  2/1926  Pringle ............................ 61/53.74
1,905,643  4/1933  Johnson ....................... 61/53.74 X
1,435,144  11/1922  Bignell .......................... 61/53.74

FOREIGN PATENTS OR APPLICATIONS
1,372,743  8/1964  France .............................. 61/72.4

Primary Examiner—Jacob Shapiro
Attorney—Rand N. Shulman et al.

[57] ABSTRACT

To place a supporting element in the soil, it is lowered into the soil after fluidizing the soil by water injection. Thereafter, consolidation of the soil is speeded up by supplying water thereto at a relatively low velocity.

4 Claims, 10 Drawing Figures

PLACING OFFSHORE SUPPORTING ELEMENTS

BACKGROUND OF THE INVENTION

1. Field of the Invention

The invention relates to supporting elements such as piles and a method of sinking such elements into the earth's surface, in particular at locations consisting of unconsolidated completely water-saturated granular material, such as the sandy bottom of a body of water.

2. Description of the Prior Art

In the past, supporting elements such as piles, usually have been let down into holes dug in the surface of the earth by driving the supporting elements into the soil, or into openings in the soil which were formed by powerful water jets during the lowering of the supporting elements into the soil. In the latter case the soil preferably consists of loose materials which can be dislodged by the water jets and carried upwards to be removed from the hole being formed.

At the end of an operation involving the use of water jets to locally remove the soil, a hole remains which contains the supporting element. A disadvantage, however, is that in most cases none or only a very small part of this hole is filled with loose sand. Another disadvantage of this method when used in loose sands is that due to the erosive action of the jets a large area surrounding the supporting element is disturbed with the result that no, or insufficient, resistance against lateral loads can be obtained.

Sinking operations by means of water jets have been carried out on land as well as at sea where the supporting elements applied were elements suitable for transferring forces or loads to the earth's surface. Such elements may, inter alia, be foundations (e.g. caissons) and foundation piles, which are suitable for transferring forces or loads having downward-directed components. For transferring forces or loads having components which are upwardly directed with respect to the earth's surface, these supporting elements may, inter alia, be ground anchors, sea anchors and piles with lateral extensions.

SUMMARY OF THE INVENTION

One object of the invention is a rapid and economic method of sinking a supporting element into the earth's surface at locations where this surface consists of non-cohesive completely water-saturated material, such as loose sand at the sea bottom, wherein the soil into which the element is sunk is not disturbed over too large a volume around the element so that a better lateral and vertical resistance to loads is obtained than with the above-mentioned jetting method.

A further object of the invention is a method of sinking a supporting element into a non-cohesive, water-saturated bottom by means of water supplied locally below the supporting element, wherein the drawback of the application of water jets flushing away the material from the hole or opening is obviated.

Another object of the invention is a method for placing supporting elements into the bottom in such a manner that they are ready for instant use.

Still another object of the invention is a method of lowering supporting elements into a bottom comprising non-cohesive water-saturated particles, wherein the elements can be lowered at a low speed and in a controlled manner.

Still a further object of the invention is a supporting element which can be sunk into the earth surface in an efficient manner.

According to the invention, water is supplied to the earth surface at the location where the supporting element is to be sunk, so as to locally fluidize the earth surface during the sinking of the element.

The supporting element may be continuously lowered with respect to the surface and water may be supplied locally below the supporting element at a selected rate sufficient to scour those particles of the earth surface which are present directly below the supporting element and to fluidize the particles around the supporting element.

The particles in the space directly surrounding the supporting element, when fluidized by the water flowing through the pore space between the particles at the selected rate, are free from each other (though occasionally making contact) and move freely with respect to each other without moving all together in the same direction. This latter situation would be reached if the flow rate of the water were increased. Such unidirectional movement is undesirable since the particles would then be carried away by the water flow and, thus, be removed from the earth surface thereby forming an open hole therein.

On the other hand, if the flow rate of water is too low, the contact stresses mutually exerted by the particles will be less than under normal conditions without water flowing through the pore space of the soil but will still be sufficiently great to prevent the particles from moving with respect to each other. Such independent movement is not reached until the flow rate of the water is sufficiently great that the impulse of the water flow acting on the particles is equal to the weight of the particles in the submerged condition.

This fluidization condition may be indicated by the following formula:

$$\rho_w Q v_w = c(\rho_s - \rho_w)(1 - \phi) g H D^2$$

wherein
- $\rho_w$ = density of the water in kg/cm$^3$,
- $Q$ = flow rate of the water in the fluidized bed in cm$^3$/sec,
- $v_w$ = velocity of the water in cm/sec,
- $c$ = a constant (related to shape of fluidized bed),
- $\rho_s$ = density of the sand particles in kg/cm$^3$,
- $\phi$ = porosity of the fluidized sand bed (about 70 percent),
- $g$ = acceleration of gravity in cm/sec$^2$,
- $H$ = height of the fluidized bed in cm, and
- $D$ = measure for horizontal extent of fluidized bed in cm.

It will be understood that when the supporting element is lowered into the earth's surface, part of the fluidized particles will be displaced from the fluidized mass. However, the space around the supporting element, in so far as this has entered the bottom, remains filled with a fluidized mass of particles.

The invention will be described in further detail with reference to the drawing in which, by way of example, various types of supporting elements are shown.

DESCRIPTION OF PREFERRED EMBODIMENTS

Figure 1:
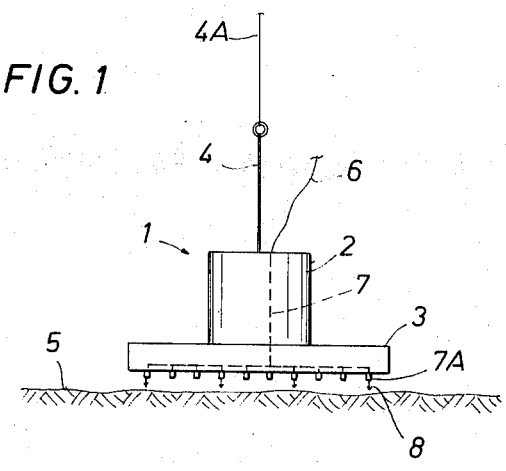
FIG. 1 shows a concrete body suitable for use as a sea anchor, positioned just above the sea bottom just prior to placement according to the method of this invention.

Referring to FIG. 1, we see a sea anchor 1 comprising a heavy body 2 provided with a lateral extension 3 at the lower end thereof, and consisting, for example, of reinforced concrete. An eye bolt 4 or other means suitable for connecting an anchor cable 4A thereto is coupled to the body 1 in a manner known per se. The lateral extension 3 greatly increases the holding power of the anchor when buried in the sea bottom 5. Water can be supplied to the area below the anchor 1 by means of a flexible conduit 6 which communicates with a distribution system 7 including a plurality of nozzles 7a distributed across the bottom surface of the anchor 1. The nozzles 7a allow water to be supplied to the zone below the bottom part of the anchor 1 in a number of streams 8 distributed over the surface of the bottom part. The upper end of the flexible conduit 6 communicates with a suitable source (not shown) of pressurized water.

The sea anchor 1 is suspended from the anchor cable 4A in a position in which the lower surface of the anchor 1 is just above the sea bottom 5. In this position, as shown in FIG. 1, water is supplied to the distribution system 7 and nozzles 7a via the flexible conduit 6. The water streams 8 issuing from the nozzles 7a scour the sea bottom 5 over the area just below the sea anchor 1. The anchor 1 is then lowered onto the sea bottom 5, as a result of which the scour action is exerted on lower levels of the sea bottom 5, thus allowing the sea anchor 1 to enter the sea bottom 5.

Figure 2:
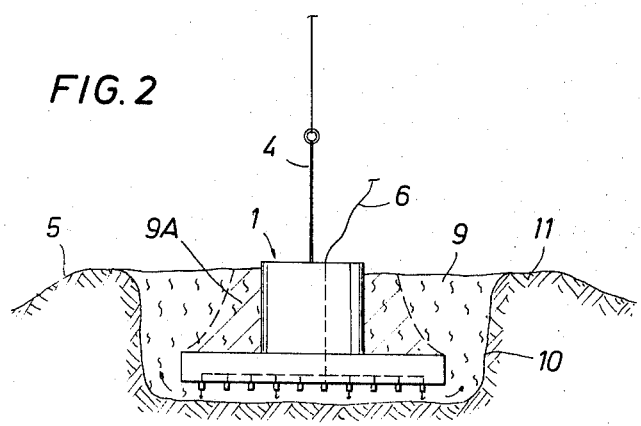
FIG. 2 shows the same anchor as in FIG. 1, during the sinking of the anchor into the sea bottom by the method of this invention.

The rate at which the water is applied to the distribution system 7 and nozzles 7a is chosen such that although the combined action of the streams 8 locally scours the sea bottom, this rate is insufficient to jet the particles from the sea bottom to form an open hole therein. The particles in the zone 9 around the supporting element are in the fluidized state, as can be seen in FIG. 2 which shows the situation when the anchor 1 is for the greater part thereof sunk into the sea bottom 5. The fluidized mass 9, having a boundary 10, overflows, as the mass is partly displaced by the anchor 1 entering the sea bottom 5, and by the expansion of the pore space between the particles as a result of the fluidization. For example, the porosity of the fluidized bed may be about 70 percent whereas the initial porosity of the sea bottom 5 was about 40 percent.

The fluidized mass 9, when overflowing the edge of the hole 10, looses its fluid property, since no water is any longer being supplied thereto, and forms a sand wall 5a on the sea bottom 5 around the location where the supporting element enters the sea bottom.

Figure 3:
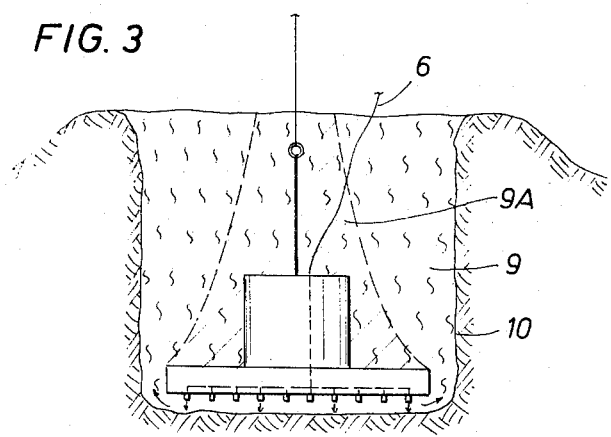
FIG. 3 shows the anchor of FIG. 1, sunk into the sea bottom to desired depth.

Since no water for fluidization is supplied to the upper part of the lateral extension 3, the mass 9 comprises an inner core 9A which is no longer fluidized. This core is supported by the anchor 1, and increases in volume when the anchor 1 is lowered into the bottom 5. FIG. 3 shows the anchor 1 when descended to the desired depth below the level of the sea bottom 5. By shutting off the supply of water via the conduit 6, the fluidization of the mass 9 is stopped and the sand will settle. Generally it will take a long time before the sand has been compacted or consolidated again to a density substantially equal to the original density thereof prior to fluidization.

Figure 4:
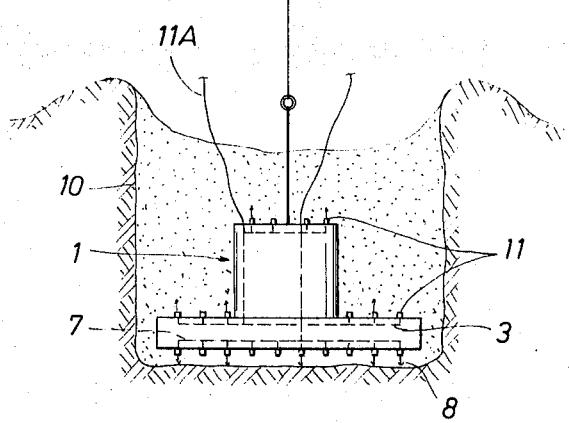
FIG. 4 shows the anchor of FIG. 1 in the position shown in FIG. 3 during consolidation of the soil which was previously fluidized.

However, if it is desired that the original density be reached at an early stage, accelerated consolidation can be obtained by not completely closing off the supply of water via the conduit 6, but by reducing the rate to a value which is insufficient for fluidization. In this case the contact pressure between the sand grains is less than when the grains are left to themselves for natural consolidation. This reduction of contact pressure decreases the friction between the grains when the latter are moving to their most dense pack and, thus, allows a more rapid consolidation of the previously fluidized mass. A flow rate of about one-third of the flow rate of water suitable for fluidzation of the mass of particles is very effective. It will be appreciated that if the area of the supporting member 1 is relatively large, the water flow for consolidating the mass of sand particles will not reach the particles located above the center part of the member 1 (cf. zone 9A in FIG. 3). Water for consolidating the sand mass above the center of the member 1 is then supplied to this mass (vide arrows 11 in FIG. 4) via a distribution system 11a which may be separate from the distribution system 7 for supplying water for fluidzation purposes. The sand mass below, around and partly above the circumferential part of the extension 3 of the member 1 is consolidated by supplying water at the required rate to the distribution system 7.

Water for consolidating the sand mass within the boundary 10 is supplied until this mass has been consolidated to a sufficient degree. Thereafter, the member 1 is ready for use.

Figure 5:
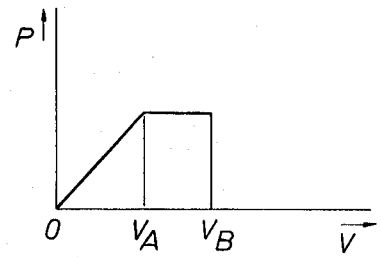
FIG. 5 shows the relationship between pore space pressure and velocity of water flow therethrough.

The relationship between the pressure, p, within the pore space of the sand particles to which water is supplied, and the upward velocity, $v$, of the water through this pore space is shown in FIG. 5. As long as the water velocity is in the range $0-v_A$, there is a Darcy flow through the pore space. This means that the pressure within the pore space increases in proportion to the velocity $v$. The contact pressure between the grains decreases with increasing velocity, until it becomes zero at velocity $v_A$. The particles are then fluidized and stay fluidzed over the range in which the water velocity is increased from $v_A$ to $v_B$. It will be appreciated that the particles with the smallest density will move to the upper zone of the fluidized mass when the velocity is within the range $v_A - v_B$ and will eventually be blown from the mass. At a further increase of the water velocity, a growing amount of sand particles of increasing specific density will be blown from the mass until finally all the particles have been flushed away by the water flow, which then acts as a water jet.

Figure 6:
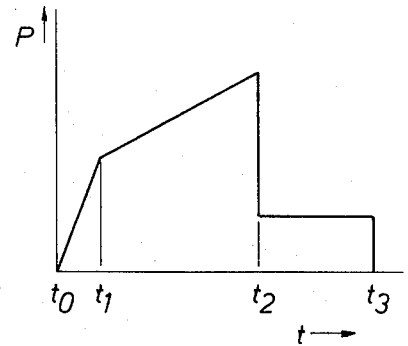
FIG. 6 shows the relationship of water pressure of the fluidizing liquid and time during sinking of the sea anchor of FIG. 1 and the consolidation of the soil following the fluidization stage.

The relationship between the water pressure P at the outlets 7a of the distribution system 7, and the time during the placement of the anchor 1 in the sea bottom is shown in FIG. 6. Over the time period $t_o-t_1$ the water flow rate is increased until at time $t_1$ the water flow rate is increased until at time $t_1$ the sand particles under the anchor 1 are scoured from the sea bottom surface and the anchor 1 is lowered into the bottom. Since the outlets of the distribution system 7 are lowered at the same time to a deeper level, the water pressure is increased to allow the water to flow at a substantially constant rate through the fluidized mass during sinking off of the anchor. At time $t_2$, the anchor is at the desired depth and the pressure is decreased to a value at which the water velocity is about one-third of the water velocity at the end of the fluidization stage. The sand mass is then consolidated and the water flow is cut off at time $t_3$ when the desired degree of consolidation has been reached.

Figure 7:
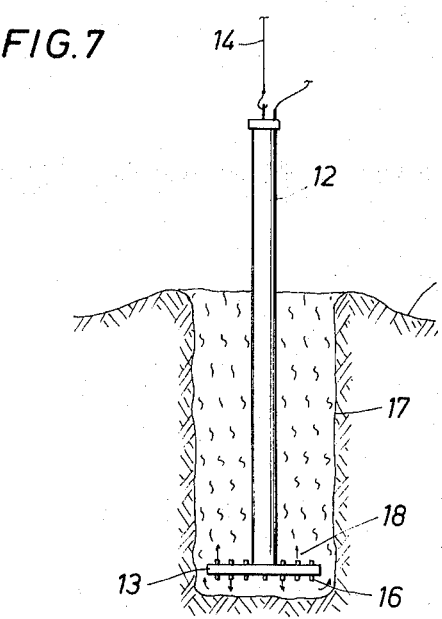
FIG. 7 shows the application of the present method when placing an anchor pile into the sea bottom.

Another application of the present invention is shown in FIG. 7. A foundation pile 12 having a disc 13 connected to the lower end thereof is supported by a cable 14 and lowered into the sea bottom 15 with continuous supply of water (vide arrows 16) to the area below the disc 13. The water is supplied via a (not shown) distribution system which has the outlet openings thereof distributed over the lower surface of the disc 13. The water is supplied at a velocity which is just sufficient to scour the sand particles of those parts of the sea bottom 15 which are directly below the disc 13 and to fluidize the sand particles directly surrounding the disc 13 and above the disc 13. Thus, a zone 17 is formed in the sea bottom 15, which zone is filled with a fluidized mass of sand particles, in which the foundation pile 12 with disc 13 is being lowered by means of the cable 14.

It will be appreciated that the water velocity through the center part of the zone 17 may be insufficient for fluidization purposes since this part is blanked off from the water flow by the disc 13. However, this non-fluidized center part does not impede the sinking-off operation.

Consolidation of the contents of the zone 17, as far as the sand particles are concerned, may be speeded up by draining the water from the pore space after the supply of water and the fluidization of the particles have been stopped. To this end, a conduit system may be arranged (not shown), which at one end thereof communicates with a water pump, and at the other end communicates with the exterior of the pipe 12 at various places and levels thereof.

In another way, consolidation may be accelerated by supplying water to the pore space of the sand mass within the zone 17 at a velocity which is insufficient to fluidize the sand mass. This water may be supplied through the water distribution system as used for the fluidization, as well as through a second distribution system which has the exits thereof just above the disc 13 (vide arrows 18 indicating the water flowing from these exits). This second distribution system may be in fluid communication with the first system as shown, or may be a separate system.

Figure 8:
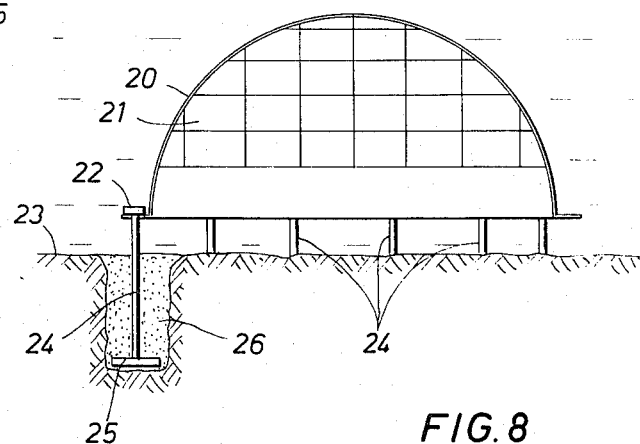
FIG. 8 shows the application of the present method for anchoring a submerged oil container.

FIG. 8 shows a way of anchoring a submerged oil storage means, which consists of a container 20 open at the lower side thereof. The oil 21 is retained within the dome-shaped container 20 and can be removed therefrom by a suitable conduit system which is known per se and not shown in the drawing since it does not form part of the present invention.

The container 20 is provided with a reinforced lower edge 22, which is anchored to the sea bottom 23 by anchor piles 24, which are of a design similar to the pile shown in FIG. 7. The disc-shaped extension 25 of each pile 24 is very useful in withstanding forces which are directed upwards, in particular when the mass of sand 26 around the pile 24 has been consolidated artificially after fluidization of the mass 26, which fluidization is necessary for sinking the pile 24 with disc-shaped extension 25 into the sea bottom 23.

Figure 9:
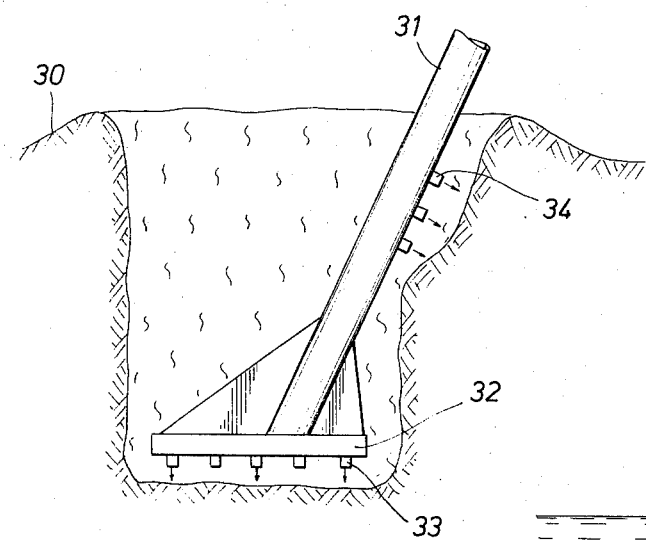
FIG. 9 shows the application of the present method for anchoring the feet of a fixed platform used for offshore operations.

FIG. 9 shows a side view of a leg of a structure placed on the sea bottom and suitable to carry a platform (not shown). Such platforms can be used as a production platform for producing oil wells therefrom, for supporting light-houses, weather stations or radar posts, and for various other purposes. The legs of these structures are partly sunk into the sea bottom 30 so as to increase the stability of the structure. As shown in the drawing, the lower end of the leg 31 carries a lateral extension 32, which has a number of nozzles 33 mounted to the lower side thereof. Water can be supplied to these nozzles 33 via the interior of the leg 31 and via conduits arranged in the body of the lateral extension 32. Further nozzles 34 are mounted on the leg 31.

Water is fed to the nozzles 33 at a rate sufficient to scour the sand of the sea bottom 30 locally (whereby the leg will start to sink into the sea bottom) and to fluidize the sand around and above the extension 32. It will be appreciated that such operation is carried out simultaneously at the other legs of the structure of which the leg 31 forms part. The water flowing from nozzles 34 will scour the sand particles when the leg has been sunk to such a depth that it will partly come into contact with a non-fluidized portion of the sea bottom 30, and fluidize the particles in the zone around this part of the leg 31.

When the desired depth has been reached, fluidization is stopped. The sand mass may be consolidated artificially in one of the manners described above.

Figure 10:
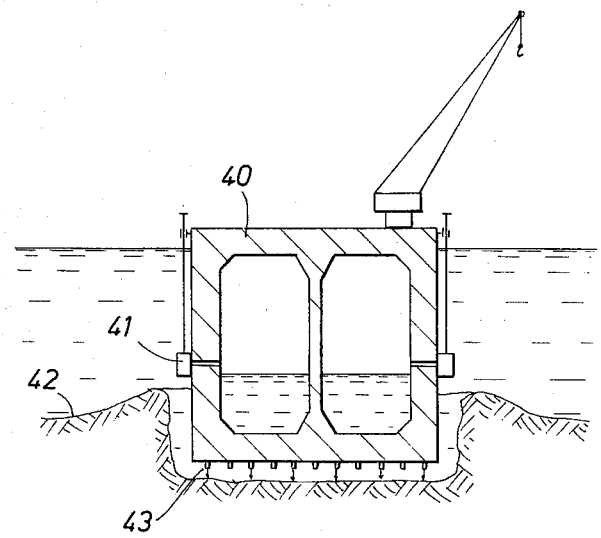
FIG. 10 shows a cross-section over a caisson which is placed in the bottom of a waterway by the present method.

Sinking of large caissons as used for land reclaiming or harbour-building may be speeded up by application of the present method. As shown in cross-section in FIG. 10, water is supplied locally below the caissons 40, during the sinking operation thereof. This sinking is performed by supplying water via the valves 41 into the interior of the caisson. The water which is used for erosion of the bottom 42 is supplied via a (not shown) suitable pipe system (vide arrows 43 indicating the water flows issuing from the exits of this pipe system), and is supplied at a rate suitable to erode the bottom 43 below the caisson 40 and to fluidize the particles in the zone adjacent to the side walls of the caisson 40. When the desired depth has been reached, the water supply is stopped.

It will be appreciated that the various supporting systems described hereinabove with reference to the drawing have been shown and described only by way of example. Without departing from the principle of the invention, the erosion of the earth surface below a supporting element, and the fluidization of the particles around the supporting element may be applied for any other supporting element when it is desired to sink such element into the earth surface, be it at sea or in a lake or any other body of water.

The water required for the erosion and fluidzation may be supplied from any suitable source. If one of the operations has to take place in the bottom of a body of water, the pump applied for raising the required water pressure may be arranged above or below the water level. The conduit system used for distributing the water to the desired places for fluidzation purposes may form an integral part of the supporting element which is to be sunk into the bottom, or be connected to the outside thereof. The system may even be connected thereto in such a manner that it is retrievable after the operation.

If desired, the fluidization conduit system may be sunk into the sea bottom separately from the supporting element, thereby creating a zone in the bottom which zone comprises a fluidized mass of particles. Thereafter a supporting element is lowered into this zone. After the element has reached the desire depth, the conduit system may be retrieved with continuous injection of water at a rate sufficient to fluidize the contents of the zone above the system which is being retrieved. In an alternative manner, the conduit system may be left in the bottom, and the supply of liquid turned off.

Further, a conduit system suitable to inject liquid at a rate sufficient for consolidation purposes may be lowered into the still fluidized bed and consolidation may take place by injecting water through this system after the fluidization conduit system has been retrieved, or the water supply thereto has been shut off or decreased to a rate sufficient for consolidation purposes.

Although the bottom into which a supporting element can be sunk by the method according to the invention has been referred to in the above as consisting of sand particles, it will be appreciated that application of the invention is not limited thereto. With equal results, the present method may be applied into parts of the earth surface which, in addition to sand particles, comprise particles having a size other than sand, such as clay or gravel. It will, however, be understood that the particles may not be cemented to each other, since in such a case little, or no, erosion and fluidization can take place.

It will further be understood that the fluidization conduit system and the consolidation conduit system may be combined to a single conduit system. By supplying liquid to this system, water will flow from the outlets above, as well as below the supporting element. By a suitable choice of the rate of water supplied to the system (and a suitable choice of the flow resistances of the various nozzles) the flow of water from the nozzles will be sufficient for fluidization (and erosion) purposes when the supporting element is lowered into the bottom of a body of water, whereas the flow of water from the nozzles is controllable so as to reduce the rate thereof to a value suitable for obtaining an artificial consolidation of the previously fluidized particles, once the supporting element has been lowered to the desired depth.

We claim as our invention:

1. In a method of sinking a supporting element into a substantially completely water-saturated unconsolidated portion of the earth's surface of the type which includes the steps of supplying water to the earth's surface where the supporting element is to be sunk through downwardly directed nozzles at a rate sufficient to locally fluidize unconsolidated particulate material which forms the earth's surface, and lowering the supporting element into the fluidized earth surface, the improvement which comprises:

supplying water locally below the supporting element at a rate sufficient to scour those particles of the earth's surface which are present directly below the supporting element and to fluidize the particles around the supporting element but at a rate less than that required to carry the particles around the supporting element uni-directionally upward, while sinking the supporting element; and thereafter reducing the velocity of the water supplied below the supporting element to a value insufficient for fluidization, but sufficient to re-orient the particles of the earth's surface, to consolidate the fluidized earth surface.

2. The method of claim 1 wherein as the supporting element is sunk into an under-water surface and the water is supplied at such a rate that the impulse of the water flow acting on the particles around the supporting element is equal to the weight of the particles in the submerged condition.

3. The method of claim 1, wherein the velocity of the water supply is reduced to about one-third of the velocity required for fluidization.

4. The method of claim 1 including the step of supplying water, at a velocity insufficient for fluidization but sufficient to re-orient the particles of the earth surface, to particles located above the supporting element through upwardly directed nozzles.

* * * * *